United States Patent [19]

Itzov

[11] Patent Number: 5,865,079

[45] Date of Patent: *Feb. 2, 1999

[54] ADJUSTABLE WORKPIECE SUPPORT APPARATUS FOR A COMPOUND MITER SAW

[75] Inventor: Andrew L. Itzov, Menomonee Falls, Wis.

[73] Assignee: Milwaukee Electric Tool Corporation, Brookfield, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 654,797

[22] Filed: May 29, 1996

Related U.S. Application Data

[63] Continuation of Ser. No. 272,327, Jul. 8, 1994, abandoned.

[51] Int. Cl.$^6$ ....................................................... B26D 7/00
[52] U.S. Cl. ......................... 83/471.3; 83/468.2; 83/581; 83/485; 83/486
[58] Field of Search .................................. 83/581, 471.3, 83/473, 472, 477.1, 468.1, 468.2, 468.3, 468.4, 485, 486, 487, 488; 269/303, 304, 315

[56] References Cited

U.S. PATENT DOCUMENTS

| | | | |
|---|---|---|---|
| D. 295,823 | 5/1988 | Brickner, Jr. et al. ...................... | D8/66 |
| 2,095,330 | 10/1937 | Hedgpeth ................................. | 143/157 |
| 2,372,699 | 4/1945 | Wiken et al. .............................. | 164/60 |
| 2,559,283 | 7/1951 | Dick, Jr. .................................... | 143/6 |
| 2,601,878 | 7/1952 | Anderson ................................. | 143/132 |
| 3,192,814 | 7/1965 | Zimmerman .............................. | 83/467 |
| 3,302,669 | 2/1967 | Edler .......................................... | 143/6 |
| 3,574,315 | 4/1971 | Boultinghouse ........................... | 143/6 |
| 3,901,498 | 8/1975 | Novak ........................................ | 269/81 |
| 4,002,094 | 1/1977 | Erickson et al. ....................... | 83/471.3 |
| 4,152,961 | 5/1979 | Batson .................................. | 83/471.3 |
| 4,206,910 | 6/1980 | Biesemeyer ............................. | 269/236 |
| 4,265,154 | 5/1981 | Batson ..................................... | 83/468 |
| 4,322,066 | 3/1982 | Disney ..................................... | 269/304 |
| 4,452,117 | 6/1984 | Brickner et al. .......................... | 83/467 |
| 4,454,793 | 6/1984 | Strong ....................................... | 83/581 |
| 4,556,094 | 12/1985 | Willocks ................................. | 144/253 |
| 4,558,618 | 12/1985 | Bachmann et al. ..................... | 269/315 |
| 4,561,336 | 12/1985 | Davis ........................................ | 85/859 |
| 4,600,184 | 7/1986 | Ashworth ................................ | 269/303 |
| 4,638,700 | 1/1987 | Fushiya et al. .......................... | 83/467 |
| 4,798,113 | 1/1989 | Viazanko ................................. | 83/471.3 |
| 4,817,693 | 4/1989 | Schuler .................................... | 144/359 |
| 4,846,036 | 7/1989 | Metzger, Jr. et al. .................... | 83/438 |
| 4,875,399 | 10/1989 | Scott et al. ............................... | 269/303 |
| 4,934,233 | 6/1990 | Brundage et al. ........................ | 83/397 |
| 5,016,693 | 5/1991 | Haffely et al. ........................... | 144/253 |
| 5,018,562 | 5/1991 | Adams ..................................... | 144/253 |

(List continued on next page.)

FOREIGN PATENT DOCUMENTS

| | | |
|---|---|---|
| 829360 | 3/1960 | United Kingdom . |
| 2270032 | 2/1994 | United Kingdom . |

*Primary Examiner*—Maurina T. Rachuba
*Attorney, Agent, or Firm*—Michael Best & Friedrich LLP

[57] ABSTRACT

A miter saw including a base having a support surface for supporting thereon a workpiece and a turntable mounted on the base for rotation about a generally vertical axis. A support is mounted on the turntable for movement therewith and a saw arm is mounted on the support for pivotal movement about a horizontal bevel angle axis such that the saw arm is adjustable to cut the workpiece at a selected bevel angle, and the saw arm being mounted on the support for pivotal movement about a second horizontal axis perpendicular to the bevel angle axis to allow movement of the saw arm between cutting and non-cutting positions. A reversible fence is removably connected to the base to support the workpiece on the base. The fence has opposite ends such that one end has a vertical edge portion for supporting the workpiece during conventional miter cutting of the workpiece and the other end has an angled edge portion for supporting the workpiece during compound miter cutting of the workpiece.

18 Claims, 5 Drawing Sheets

U.S. PATENT DOCUMENTS

| | | | |
|---|---|---|---|
| 5,038,650 | 8/1991 | Hodge | 83/471.3 |
| 5,063,805 | 11/1991 | Brundage | 83/581 |
| 5,090,283 | 2/1992 | Noble | 83/467.1 |
| 5,116,249 | 5/1992 | Shiotani et al. | 83/435.001 |
| 5,146,826 | 9/1992 | Shiotani et al. | 83/468.2 |
| 5,181,448 | 1/1993 | Terpetra | 83/468.3 |
| 5,191,935 | 3/1993 | McCombie | 144/286 |
| 5,201,863 | 4/1993 | Peot | 83/432 |
| 5,205,198 | 4/1993 | Foray et al. | 83/435.001 |
| 5,220,857 | 6/1993 | Freeburger | 83/468.3 |
| 5,228,374 | 7/1993 | Santeramo, Sr. | 83/438 |
| 5,230,269 | 7/1993 | Shiotani et al. | 83/468.7 |
| 5,282,408 | 2/1994 | Shiotani et al. | 83/432 |
| 5,297,463 | 3/1994 | O'Banion et al. | 83/471.3 |
| 5,347,902 | 9/1994 | Brickner et al. | 83/581 |
| 5,437,214 | 8/1995 | Sasaki et al. | 83/581 |

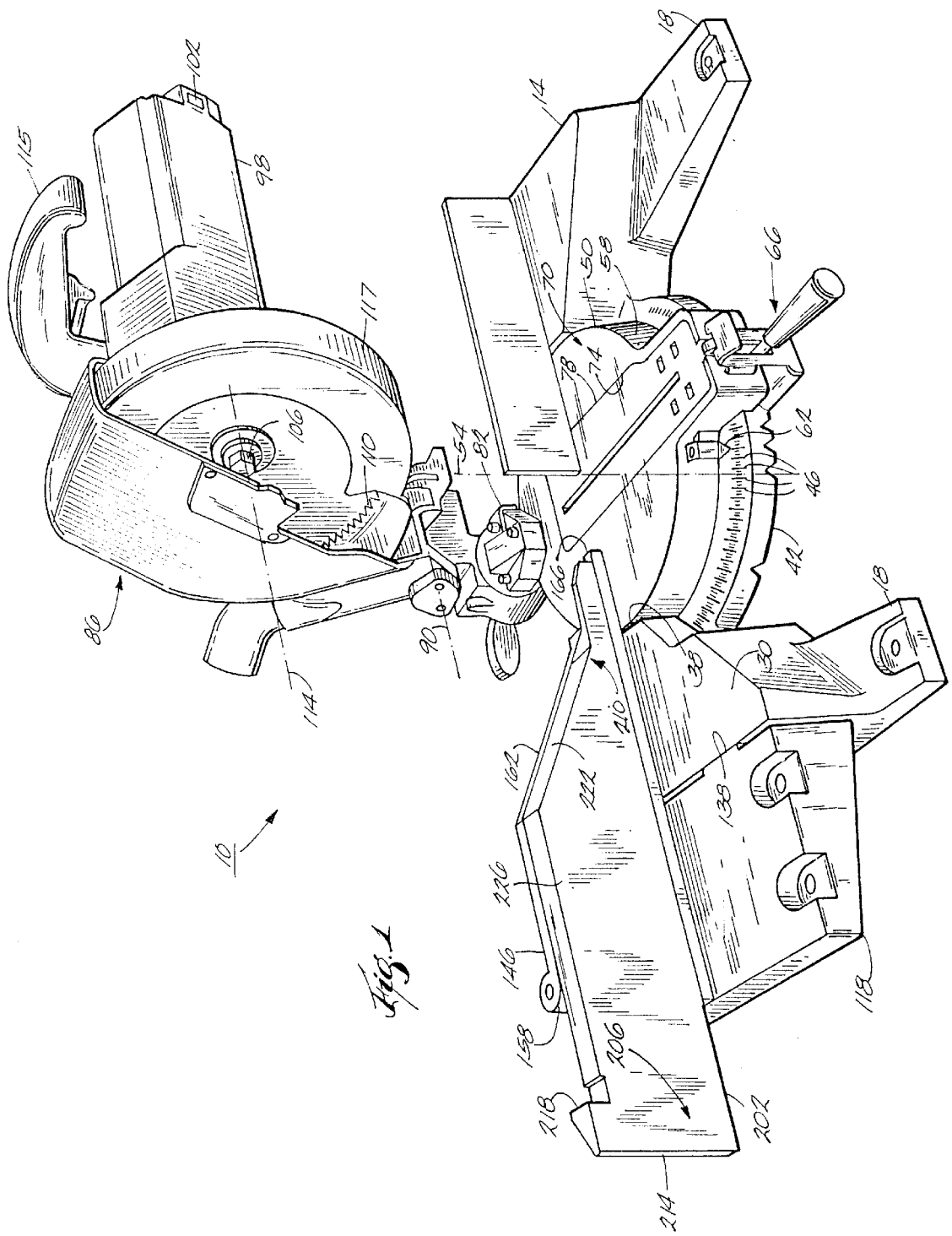

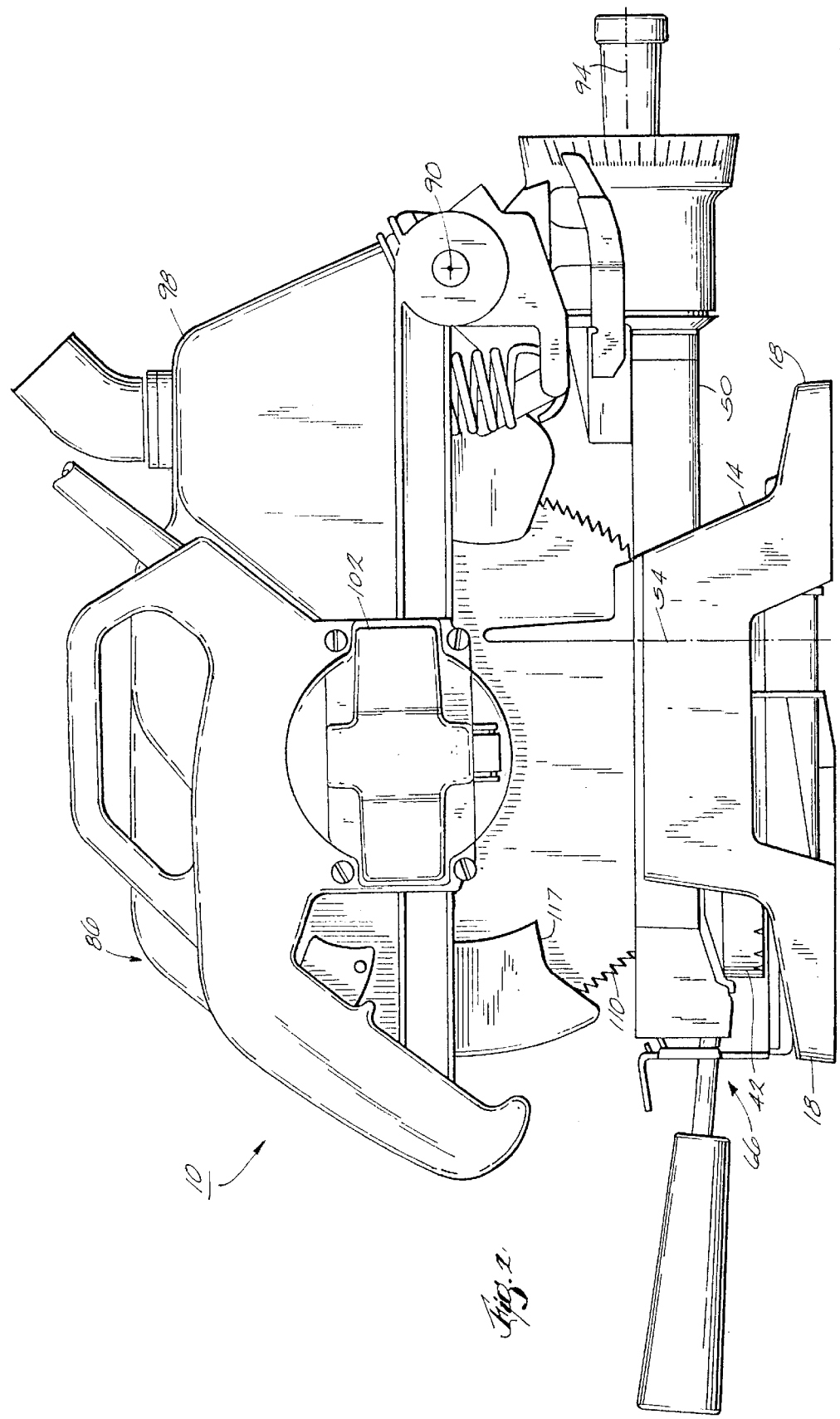

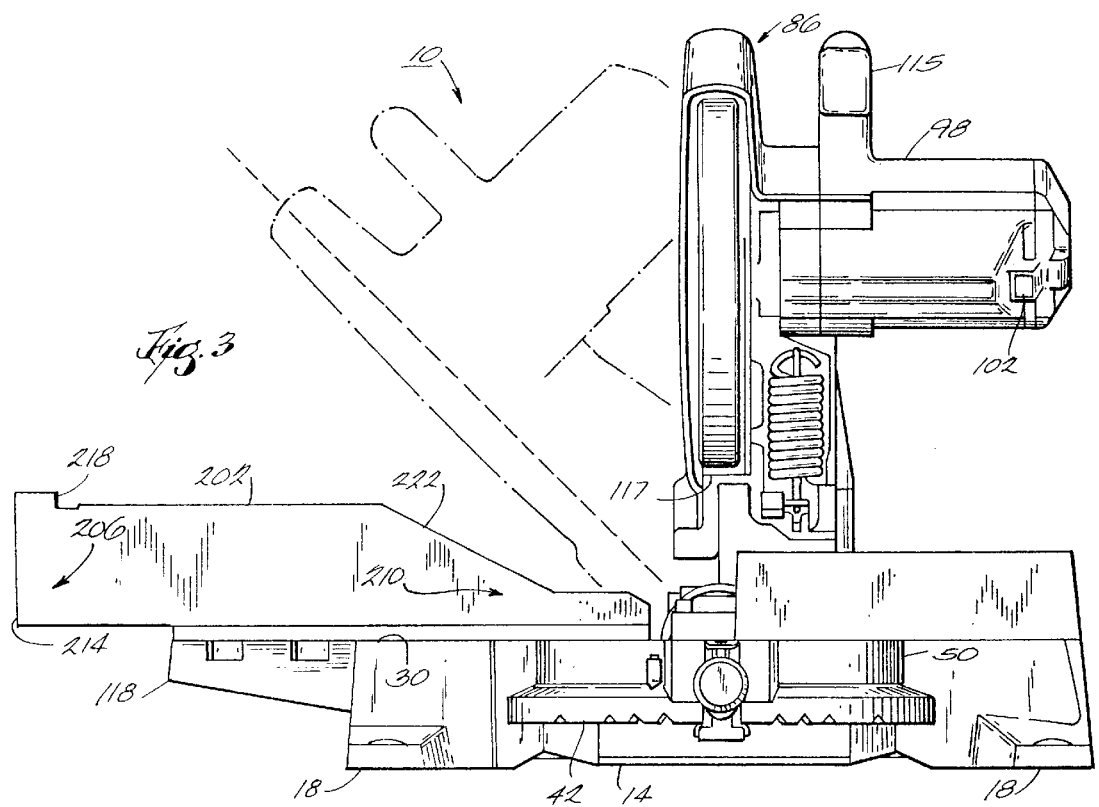

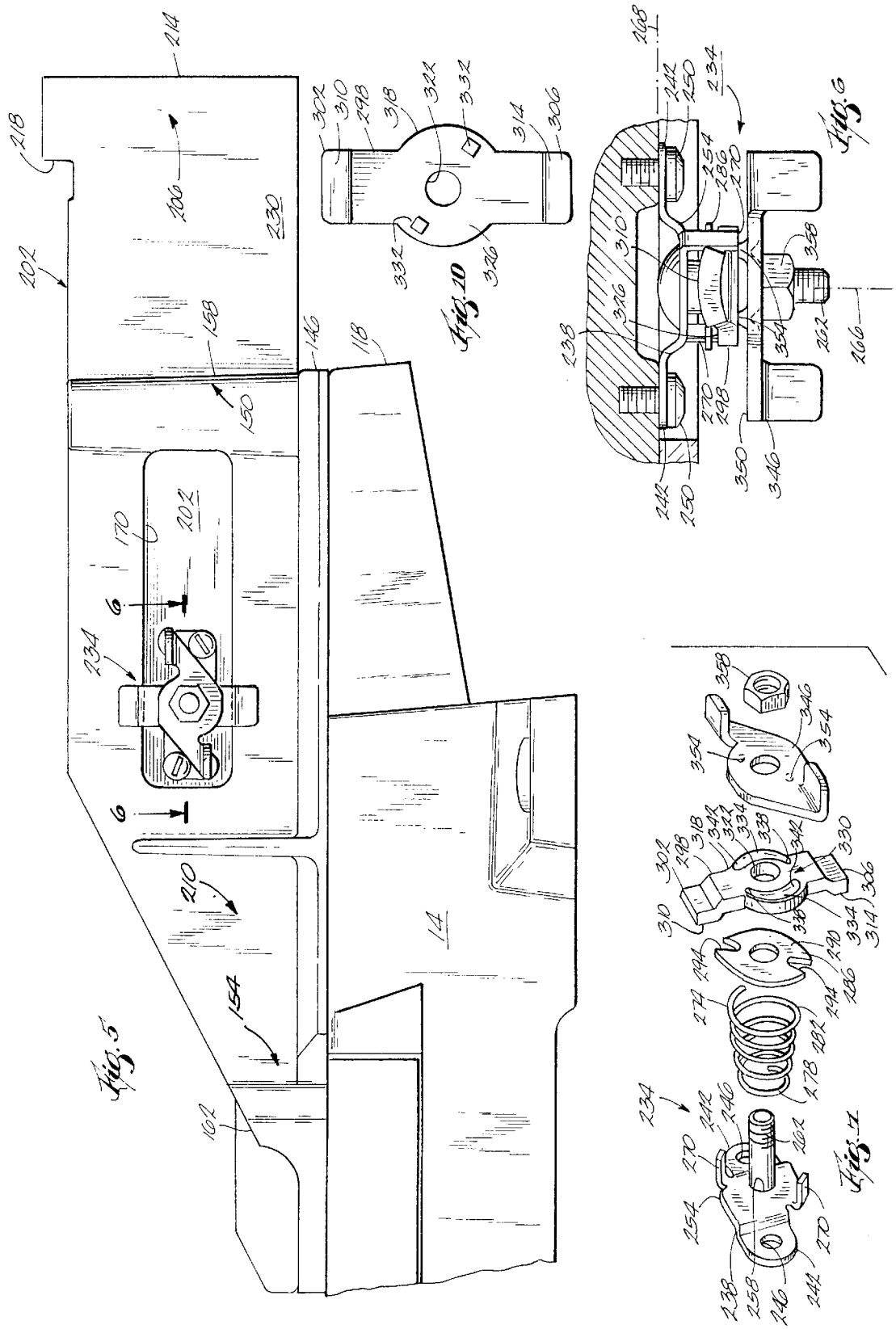

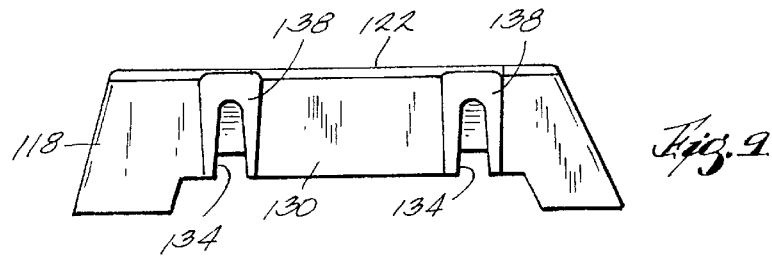
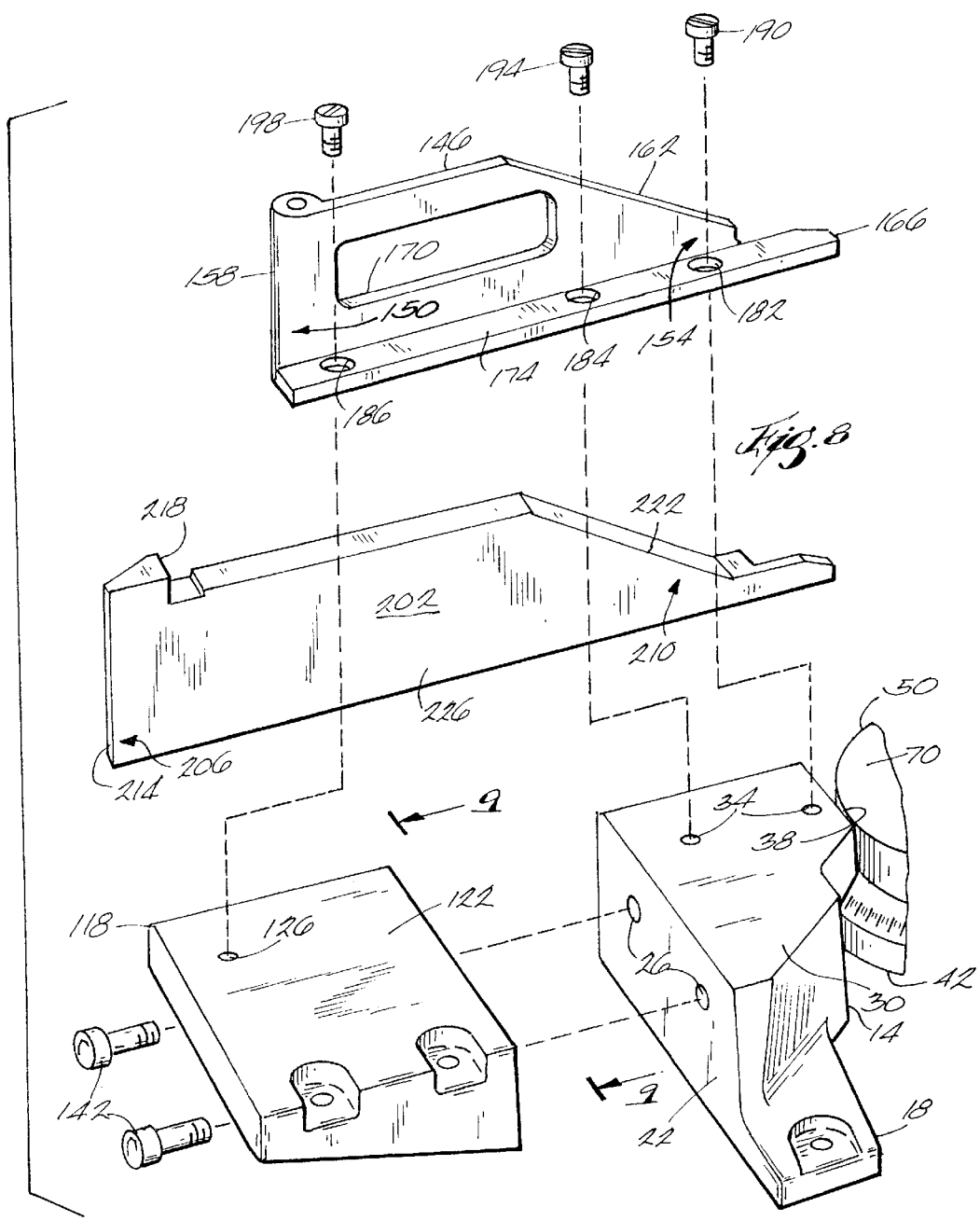

ADJUSTABLE WORKPIECE SUPPORT APPARATUS FOR A COMPOUND MITER SAW

This is a Continuation of application Ser. No. 08/272,327, filed Jul. 8, 1994, entitled "ADJUSTABLE WORKPIECE SUPPORT APPARATUS FOR A COMPOUND MITER SAW", now abandoned.

BACKGROUND OF THE INVENTION

The invention relates to miter saws and in particular to a miter saw and a fence assembly for supporting a workpiece during cutting of the workpiece.

Compound miter saws, typically include a base having a support surface for supporting a workpiece and a turntable mounted on the base for pivotal movement about a vertical axis. A saw arm is supported by the turntable for movement therewith, and a fence is supported by the base to provide support for a workpiece on the support surface during cutting of the workpiece. The saw arm has a saw blade and is pivotable about a horizontal axis between non-cutting and cutting positions. If it is desired to engage in compound miter cutting of the workpiece, the saw arm is pivoted about a horizontal bevel angle axis to allow the user to make the angular cuts in the workpiece. In some prior art miter saws, to provide sufficient clearance for the blade of the saw arm and yet provide adequate vertical support to the workpiece during the cutting of the workpiece, the end of the fence adjacent the saw blade has an angular edge portion. The angular edge portion is intended to provide support for the workpiece while also providing clearance for the saw blade during compound miter cutting of the workpiece. It is known in the art to adjust the position of the fence toward and away from the saw blade to allow cutting at extreme bevel angles and yet provide support to the workpiece.

SUMMARY OF THE INVENTION

It is an object of the invention to provide a miter saw including a fence that will support a workpiece as close to the saw blade as possible regardless of the position of the saw blade.

The miter saw embodying the invention includes an adjustable and reversible fence removably connected to the base. The fence includes a forwardly facing vertical surface which provides support for the workpiece. The fence includes opposite ends and the fence can be selectively removed from the miter saw, reversed end-for-end, and reinstalled on the miter saw to selectively and alternately position the opposite ends adjacent the cutting path of the saw blade. One of the ends of the fence has a vertical edge and that end of the fence can be used for supporting the workpiece during conventional miter cutting of the workpiece (i.e., when the saw arm is at a 0° bevel angle axis or, in other words, is in the vertical position and the saw blade defines a vertical planar cutting path). The vertical edge portion of the fence provides a greater degree of support to the workpiece during conventional miter cutting than compound miter saw workpiece support fences of the prior art. The fence can be selectively repositioned or reversed end-over-end such that the opposite end of the fence is adjacent the cutting path of the saw blade. This opposite, other end of the fence has an angled edge for supporting the workpiece during compound miter cutting of the workpiece.

In one embodiment of the invention, the fence includes a clamp for selectively securing the fence to the base. Specifically, a fence support is mounted on the base and includes a generally rectangular aperture. The clamp of the fence extends through the aperture. The clamp includes a mounting bracket connecting the clamp to the fence, a clamp member and an actuating member all of which are connected to one another by a pivot pin. The actuating member is selectively pivotable to cause the clamp member to engage the fence support and secure the fence to the fence support.

In one embodiment of the invention, the miter saw includes a base extension having an upper surface and being connected to the base to provide a smooth continuous upper surface with the workpiece support surface of the base. The fence is connected to the base and to the base extension to support the workpiece during cutting of the workpiece.

A principal advantage of the invention is the provision of a miter saw having a reversible fence for supporting the workpiece during both conventional miter cutting of the workpiece and compound miter cutting of the workpiece.

Another advantage of the invention is the provision of a clamp for removably securing the fence to the base.

Another advantage of the invention is the provision of a base extension providing a smooth continuous workpiece support surface with the support surface of the base.

Another advantage of the invention is the provision of an adjustable workpiece support fence for a compound miter saw.

Other features and advantages of the invention will become apparent to those skilled in the art upon review of the following detailed description, claims and drawings.

BRIEF DESCRIPTION OF THE DRAWINGS

FIG. 1 is a perspective view of a compound miter saw embodying the invention.

FIG. 2 is a right side-elevational view of the compound miter saw showing the saw arm in the lowered, cutting position.

FIG. 3 is a front elevational view of the compound miter saw showing the workpiece support fence in the compound miter cutting position.

FIG. 4 is a front elevational view of the compound miter saw showing the workpiece support fence in the conventional miter cutting position.

FIG. 5 is an enlarged partial, rear elevational view of the compound miter saw showing the base, the fence support, and the workpiece support fence connected to the fence support.

FIG. 6 is a view taken along line 6—6 in FIG. 5 showing a clamp mechanism for securing the workpiece support fence to the fence support.

FIG. 7 is an exploded view of the clamp mechanism.

FIG. 8 is an exploded view showing the base, base extension, fence support and workpiece support fence.

FIG. 9 is a view taken along line 9—9 in FIG. 8.

FIG. 10 is a view showing the clamp member of the clamp mechanism.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

BRIEF DESCRIPTION OF THE PREFERRED EMBODIMENT

Shown in FIG. 1 of the drawings is a miter saw 10 embodying the invention. The miter saw 10 includes a base 14 having four feet 18 (only two of which are shown in FIG. 1) for supporting the miter saw 10 on a surface. The base 14 also includes a horizontal workpiece support surface 30 (FIG. 1) for supporting a workpiece (not shown) to be cut. The workpiece support surface 30 includes a generally circular aperture 38 and a skirt 42. The skirt 42 includes a plurality of markings 46 the purpose of which is described in greater detail below.

The miter saw 10 also includes a generally circular turntable 50 housed in the generally circular aperture 38 of the base 14. The turntable 50 is supported by the base 14 for rotation about a vertical axis 54. The turntable 50 includes a periphery 58 and a pointer 62. The pointer 62 indicates a selected marking 46 on the skirt 42 of the base 14 to indicate the miter angle to which the turntable 50 is adjusted relative to the base 14. A locking mechanism 66 is also provided for locking the turntable 50 in any selected position of angular adjustment. The turntable 50 also has a workpiece support surface 70 which forms a continuous support surface with the workpiece support surface 30 of the base 14. The turntable 50 has an aperture 74, and a kerf plate 78 is mounted on the turntable 50 to cover the aperture 74 and support the workpiece during cutting of the workpiece.

The miter saw 10 also includes a support structure 82 mounted on the turntable 50 for movement with the turntable 50. A saw arm 86 is supported by the support structure 82 for pivotal movement about a first horizontal axis 90 between a cutting position (FIG. 2) and a non-cutting position (FIGS. 1, 3 and 4). The saw arm is also supported for adjustment about a bevel angle axis 94 (FIG. 2) to allow compound miter cutting of the workpiece at bevel angles of between 0° (vertical, as shown in FIGS. 3 and 4) and 45° from vertical (shown in phantom in FIG. 3).

Referring again to FIG. 1, the saw arm 86 includes a housing 98 supporting a saw motor 102, an arbor 106 drivingly connected to the saw motor 102, and a saw blade 110 for cutting the workpiece. The saw blade 110 is mounted on the arbor 106 for rotation therewith about an arbor axis 114 defined by the arbor 106 and, as the saw arm 86 is moved from the non-cutting position to the cutting position, the saw blade 110 defines a generally planar cutting path. The saw arm 86 also includes a handle 115 for moving the saw arm 86 from the non-cutting position to the cutting position.

The saw arm 86 also includes a movable blade guard 117. The movable blade guard 117 substantially covers the saw blade 110 when the saw arm 86 is in the non-cutting position. The movable blade guard 117 is mounted for pivotal movement about the arbor axis 114 between a surrounding position, substantially covering the saw blade 110, and a non-surrounding position, gradually exposing the blade 110 during cutting of the workpiece and as the saw arm 86 is moved between the non-cutting and cutting positions.

The miter saw 10 also includes a base extension 118 connected to the end surface 22 (FIG. 8) of the base 14. The base extension 118 includes a workpiece support surface 122 (FIGS. 8 and 9) which, like the workpiece support surface 70 of the turntable 50, forms a smooth continuous support surface with the workpiece support surface 30 of the base 14. The base extension 118 has a threaded bore 126 in the workpiece support surface 122. The base extension 118 also includes a generally vertical end wall 130. The end wall 130 has a pair of slotted apertures 134 and a raised engaging surface 138 surrounding each aperture 134 and for engaging the end surface 22 of the base 14. The base 14 includes a generally vertical end surface 22 (FIG. 8) having therein a pair of threaded bores 26. A bolt 142 extends through each aperture 134 and is threaded into the respective bore 26 in the end surface 22 of the base 14 to secure the base extension 118 to the base 14. The base extension 118 provides an extended support to provide additional support to the workpiece during cutting of the workpiece at extreme compound miter angles, e.g., a 45° bevel angle.

The miter saw 10 also includes a fence support 146 mounted on the base 14 and the base extension 118 of the miter saw 10. The fence support 146 is an elongated member having opposite end portions 150 and 154. As best shown in FIG. 8, the end portion 150 has a vertical edge 158 and the end portion 154 has an angular edge 162 which slopes upwardly and away from the cutting path of the saw blade 110 and defines an end surface 166. The fence support 146 includes an elongated, generally rectangular aperture 170. The fence support 146 also includes a flange 174 extending along the lower edge portion of the fence support 146. The flange 174 includes three through-bores 182, 184, and 186. Three threaded bolts 190, 194, and 198, extend through the respective through-bores and into threaded bores 34 in the workpiece support surface 70 of the base 14 and the threaded bore 126 in the workpiece support surface 122 of the base extension 118, respectively, to secure the fence support 146 to the base 14 and to the base extension 118.

The miter saw 10 also includes a removable, reversible workpiece support fence 202. As best shown in FIGS. 1, 5 and 8 the workpiece support fence 202 is an elongated member having opposite end portions 206 and 210 (FIGS. 1 and 8 only). The workpiece support fence 202 also includes a vertical, planar front surface 226 (FIG. 8) for providing vertical support to the workpiece and a generally planar rear surface 230 which engages the fence support 146. As shown in detail in FIG. 8, the front surface 226 has a vertical edge 214 adjacent the end portion 206. A locating key, or stop, 218 extends upwardly from the reversible workpiece support fence 202 adjacent the vertical edge 214 when the reversible workpiece support fence 202 is positioned as shown in FIGS. 1, 3, and 5. The front surface 226 also has an angular edge 222 adjacent the end portion 210. The angular edge 222 of the reversible workpiece support fence 202 extends upwardly and away from the cutting path of the saw blade 110 when the reversible workpiece support fence 202 is positioned as shown in FIGS. 1, 3, and 5. The angular edge 222 of the reversible workpiece support fence 202 provides support to the workpiece during compound miter cutting of the workpiece.

The miter saw 10 also includes a clamp mechanism 234 (FIGS. 5, 6 and 7) connected to the rear surface 230 of the reversible workpiece support fence 202. The clamp mechanism 234 includes a mounting bracket 238 having opposite end portions 242 and a through-bore 246 (FIG. 7) in each of the end portions 242. A threaded bolt 250 extends through each through-bore 246 and into the rear surface 230 of the reversible workpiece support fence 202 to secure the clamp mechanism 234 to the reversible workpiece support fence 202. The mounting bracket 238 also includes a center portion 254 and a through-bore 258 in the center portion 254. A carriage bolt pivot pin 262 extends through the through-bore 258 in a direction away from the rear surface 230 of the reversible workpiece support fence 202 and defines an axis 266 (FIG. 6) which is perpendicular to the plane 268 (shown in phantom as a line) defined by the rear surface 230 of the reversible workpiece support fence 202. The mounting bracket 238 also includes a pair of stop members 270 positioned on opposite sides of the axis 266, spaced from the pivot pin 262, and extending axially in a direction away from the rear surface 230 of the reversible workpiece support fence 202.

The clamp mechanism 234 also includes a helical spring 274 (FIG. 7) mounted on the pivot pin 262. The helical spring 274 has one end 278 which engages the mounting bracket 238 and an opposite end 282. A washer 286 is mounted on the pivot pin 262 to engage the end 282 of the helical spring 274. The washer 286 includes a continuous outer edge 290 defining oppositely disposed notches 294. Each notch 294 engages a respective stop member 270 on the mounting bracket 238 to secure the washer 286 in a fixed rotational position relative to the axis 266 and guide the washer 286 for axial movement along the axis 266.

The clamp mechanism 234 also includes a clamp member 298 mounted on the pivot pin 262 to engage the washer 286. As shown in FIGS. 7 and 10, the clamp member 298 includes opposite end portions 302 and 306 defining clamping surfaces 310 and 314 (FIG. 10), respectively, and a central portion 318 having therein a surface 326 and a through-bore 322 through which the pivot pin 262 extends. The central portion 318 of the clamp member 298 includes a first surface 326 (FIGS. 6 and 10) which engages the washer 286 and a second surface 330 (FIG. 7). As shown in FIG. 10, the surface 326 has a pair of detents 332. The detents 332 fit into the respective notches 294 (FIG. 7) when the clamp member 298 is in a clamped position to provide a detectable resistance to movement of the clamp member 298 from the clamped position. The second surface 330 defines a pair of bearing pockets 334 positioned on opposite sides of the axis 266 and spaced radially from the axis 266. The bearing pockets 334 are arranged in a generally circular configuration. Each bearing pocket 334 has a shallow end 338 (FIG. 7) and a deep end 342 (FIG. 7) and the depth of each bearing pocket 334 gradually increases moving from the shallow end 338 counter-clockwise toward the deep end 342.

The clamp mechanism 234 also includes an actuating member 346 mounted on the pivot pin 262. The actuating member 346 has a bearing surface 350 (FIG. 6) and a pair of projections 354 formed in the bearing surface 350. The projections 354 are positioned on opposite sides of the axis 266 and are spaced from the axis 266 so that each bearing pocket 334 receives therein a respective projection 354. A conventional threaded locking nut 358 secures the helical spring 274, washer 286, clamp member 298, and actuating member 346 on the pivot pin 262.

In operation, if it is desired to engage in compound miter cutting of the workpiece, i.e., cutting of the workpiece at a bevel angle relative to horizontal, the actuating member 346 of the clamp mechanism 234 is positioned rotationally so that the projections 354 are positioned in the deep end 342 of the respective circular bearing pockets 334. In this position, the actuating member 346 and the clamp member 298 are in a generally horizontal position (not shown), i.e., in alignment with the elongated reversible workpiece support fence 202 and with the rectangular aperture 170 in the fence support 146. The position of the clamp member 298 and the actuating member 346 allow slidable adjustment of the reversible workpiece support fence 202 on the fence support 146 so that the clamp mechanism 234 extends through the aperture 170. In order to engage in compound miter cutting of the workpiece, the end portion 210 is positioned adjacent the saw blade 110 of the saw arm 86 (FIGS. 3 and 5). To secure the reversible workpiece support fence 202 to the fence support 146, the actuating member 346 is manually pivoted clockwise about the axis 266 of the pivot pin 262. The rotational force of the projections 354 on the clamp member 298 causes pivotal movement of the clamp member 298 about the axis 266. The pivotal movement of the clamp member 298 ceases as soon as the clamp member 298 engages the stop members 270 on the mounting bracket 238 (FIGS. 5 and 6). In this position, the clamp member 298 is vertically oriented. As the actuating member 346 continues to pivot about the axis 266, the projections 354 begin to slide within the bearing pockets 334 and toward the shallow ends 338 of the respective bearing pockets 334. The movement of the projections 354 toward the shallow end 338 of the respective bearing pockets 334 causes axial movement of the clamp member 298 so that the clamping surfaces 310 and 314 engage the fence support 146 thereby securing the reversible workpiece support fence 202 to the fence support 146.

If it is desired to engage in conventional miter cutting of the workpiece, the clamp mechanism 234 can be disengaged by pivoting the actuating member 346 in the opposite (counter-clockwise) direction until the clamp member 298 is once again in a horizontal position. The reversible workpiece support fence 202 is then removed from the fence support 146 and inverted so that the end portion 206 having the vertical edge 214 is adjacent the saw blade 110 of the saw arm 86 (shown in FIG. 4). The locating key, or stop, 218 adjacent the vertical edge 214 of the reversible workpiece support fence 202 is fitted onto the end surface 166 of the fence support 146. In doing so, the vertical edge 214 of the reversible workpiece support fence 202 is correctly positioned adjacent the saw blade 110 to support a workpiece for conventional miter cutting of the workpiece. When the reversible workpiece support fence 202 is correctly positioned, the actuating member 346 of the clamp mechanism 234 can again be rotated in the clockwise direction to cause engagement between the clamping surfaces 310 and 314 of the clamp member 298 and the fence support 146 to secure the reversible workpiece support fence 202 to the fence support 146.

Various features and advantages of the invention are set forth in the following claims.

I claim:

1. A miter saw comprising:

a base having a workpiece support surface for supporting a workpiece;

a turntable supported by the base for rotation about a generally vertical axis;

a saw arm having a vertical position and being supported by the turntable for pivotal movement about a horizontal bevel angle axis such that the position of the saw arm is adjustable from the vertical position and with respect to the base workpiece support surface to facilitate cutting of the workpiece at a selected bevel angle, and the saw arm being mounted for pivotal movement about a second horizontal axis perpendicular to the bevel angle axis between cutting and non-cutting positions; and a reversible fence having a workpiece support surface and including a clamp mechanism for removably connecting the reversible fence to the base to support the workpiece on the base, and the reversible fence having a first end including a vertical edge and having a second end including an angled edge and the fence being positionable in a first position when the saw arm is in the vertical position such that the vertical edge is adjacent to the cutting path of the saw blade for supporting the workpiece during conventional miter cutting of the workpiece and the fence being end-for-end reversible to a second position wherein the angled edge is adjacent to the cutting path of the saw blade for supporting the workpiece during compound miter cutting of the workpiece.

2. A miter saw according to claim 1 wherein the miter saw further comprises a fence support and wherein the clamp mechanism includes a clamp member and an actuating member pivotally connected to the clamp member for pivotal movement about a clamp member pivot axis such that pivotal movement of the actuating member causes pivotal movement of the clamp member about the clamp member pivot axis and axial movement of the clamp member relative to the actuating member such that the clamp member engages the fence support to secure the reversible fence to the fence support.

3. A miter saw according to claim 1 wherein the reversible fence includes a stop adjacent the vertical edge and engageable with the fence support to position the reversible fence in the first position so that the vertical edge is proximal to the cutting path of the saw blade.

4. A miter saw according to claim 1 and further comprising means for adjusting the position of the reversible fence toward and away from the saw blade whenever the reversible fence is in the second position.

5. A miter saw according to claim 1 and further including a base extension having an upper surface, the base extension being connected to the base to provide a smooth continuous upper surface with the workpiece support surface of the base.

6. An elongated, removable workpiece support fence for use on the base of a compound miter saw to support a workpiece on the base, the miter saw having a fence support mounted on the base and a saw blade for cutting the workpiece, the saw blade defining a cutting path and the workpiece support fence comprising:

a first end having a vertical edge for supporting the workpiece when the workpiece support fence is in a first position such that the first end is adjacent the cutting path of the saw blade;

a second end having an angled edge for supporting the workpiece when the workpiece support fence is in a second position such that the second end is adjacent the cutting path of the saw blade; and means for removably connecting the workpiece support fence to the base such that the fence is positionable in a first position when the saw arm is in the vertical position such that the vertical edge is adjacent to the cutting path of the saw blade for supporting the workpiece during compound miter cutting of the workpiece and the fence being end-for-end reversible to a second position wherein the angled edge is adjacent to the cutting path of the saw blade for supporting the workpiece during compound miter cutting of the workpiece.

7. A workpiece support fence according to claim 6 wherein the means for removably connecting the workpiece support fence to the base includes a clamp mechanism for selectively securing the workpiece support fence to the fence support.

8. A workpiece support fence according to claim 7 wherein the clamp mechanism includes a clamp member and an actuating member pivotally connected to the clamp member for pivotal movement about a clamp member pivot axis such that pivotal movement of the actuating member causes axial movement of the clamp member to clamp the workpiece support fence to the fence support.

9. A workpiece support fence according to claim 7 wherein the clamp mechanism includes a clamp member and an actuating member pivotally connected to the clamp member for pivotal movement about a clamp member pivot axis such that pivotal movement of the actuating member causes pivotal movement of the clamp member about the clamp member pivot axis and axial movement of the clamp member relative to the actuating member such that the clamp member engages the fence support to secure the workpiece support fence to the fence support.

10. A workpiece support fence according to claim 7 wherein the workpiece support fence includes a stop adjacent the vertical edge to position the workpiece support fence in the first position such that the vertical edge is proximal to the saw blade.

11. A workpiece support fence according to claim 6 wherein the workpiece support fence includes means for adjusting the position of the workpiece support fence toward and away from the cutting path of the saw blade whenever the second end of the workpiece support fence is proximal to the cutting path of the saw blade.

12. A miter saw comprising:

a base having a workpiece support surface for supporting a workpiece and having a fixed fence including a vertical support surface;

a turntable supported by the base for rotation about a generally vertical axis;

a saw arm having a saw blade and being supported by the turntable for pivotal movement about a horizontal axis between cutting and non-cutting positions to define a cutting path for the saw blade; and a reversible fence having a workpiece support surface and having a first end and a second end; and a clamp mechanism removably mounting the reversible fence to the base such that the reversible fence is positionable in a first position wherein the reversible fence support surface is substantially in the same plane as the fixed fence support surface and the first end is adjacent the cutting path of the saw blade, and such that the reversible fence is end-for-end reversible to a second position wherein the reversible fence support surface is substantially in the same plane as the fixed fence support surface and the second end is adjacent the cutting path of the saw blade.

13. A miter saw according to claim 12 wherein the first end has a generally vertical edge for supporting the workpiece when the fence is in the first position.

14. A miter saw according to claim 12 wherein the second end has an angled edge for supporting the workpiece when the reversible fence is in the second position, the angled edge sloping upwardly and away from the cutting path of the saw blade when the reversible fence is in the second position.

15. A miter saw according to claim 12 wherein the miter saw further comprises a fence support and wherein the clamp mechanism includes a clamp member and an actuating member pivotally connected to the clamp member for pivotal movement about a clamp member pivot axis such that pivotal movement of the actuating member causes pivotal movement of the clamp member about the clamp member pivot axis and axial movement of the clamp member relative to the actuating member such that the clamp member engages the fence support to secure the reversible fence to the fence support.

16. A miter saw according to claim 15 wherein the reversible fence includes a stop adjacent the vertical edge and engageable with the fence support to position the reversible fence in the first position so that the vertical edge is proximal to the cutting path of the saw blade.

17. A miter saw according to claim 12 and further comprising means for adjusting the position of the reversible fence toward and away from the saw blade whenever the reversible fence is in the second position.

18. A miter saw according to claim 12 and further including a base extension having an upper surface, the base extension being connected to the base to provide a smooth continuous upper surface with the workpiece support surface of the base.

* * * * *